United States Patent
Hasegawa

(10) Patent No.: US 9,778,972 B2
(45) Date of Patent: Oct. 3, 2017

(54) OPERATION MANAGEMENT DEVICE, OPERATION MANAGEMENT METHOD

(75) Inventor: Hideo Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 672 days.

(21) Appl. No.: 14/238,241

(22) PCT Filed: Jul. 31, 2012

(86) PCT No.: PCT/JP2012/069931
§ 371 (c)(1),
(2), (4) Date: Feb. 11, 2014

(87) PCT Pub. No.: WO2013/027562
PCT Pub. Date: Feb. 28, 2013

(65) Prior Publication Data
US 2014/0195868 A1 Jul. 10, 2014

(30) Foreign Application Priority Data
Aug. 24, 2011 (JP) .................................. 2011-182261

(51) Int. Cl.
G06F 11/07 (2006.01)
G06F 11/32 (2006.01)
G06F 11/34 (2006.01)

(52) U.S. Cl.
CPC ........ *G06F 11/0769* (2013.01); *G06F 11/076* (2013.01); *G06F 11/0706* (2013.01);
(Continued)

(58) Field of Classification Search
CPC ............ G06F 11/3466; G06F 11/0736; G06F 11/076; G06F 11/327; G06F 11/3409;
(Continued)

(56) References Cited

U.S. PATENT DOCUMENTS

| 2007/0005296 A1 | 1/2007 | Beresniewicz et al. |
| 2010/0205483 A1* | 8/2010 | Ishiou ................. G06F 11/0709 714/26 |
| 2011/0190978 A1* | 8/2011 | Mao ....................... B60R 25/00 701/33.4 |

FOREIGN PATENT DOCUMENTS

| CH | EP 1895416 A1 * | 3/2008 | ......... G05B 23/0272 |
| EP | 1895416 A1 | 5/2008 | |

(Continued)

OTHER PUBLICATIONS

Extended European Search Report of EP Application No. 12825909.0 dated Mar. 24, 2015.
(Continued)

*Primary Examiner* — Manuel L Barbee
(74) *Attorney, Agent, or Firm* — Finnegan, Henderson, Farabow, Garrett & Dunner, L.L.P.

(57) ABSTRACT

An operation management to grasp a metric in which a continuous abnormality has occurred in a system, easily, is provided. An operation management apparatus 100 includes a metric collection unit (101) and an abnormality score calculation unit (104). The metric collection unit (101) collects a measured value of each of a plurality of metrics in a system sequentially. The abnormality score calculation unit (104) calculates and outputs, on the basis of a continuity level indicating a degree of continuity of an abnormality of the measurement value for each of the plurality of metrics at each time, an abnormality score for the metric.

18 Claims, 13 Drawing Sheets

(52) U.S. Cl.
CPC ........ *G06F 11/079* (2013.01); *G06F 11/0736* (2013.01); *G06F 11/0751* (2013.01); *G06F 11/327* (2013.01); *G06F 11/3466* (2013.01); *G06F 11/3409* (2013.01); *G06F 11/3447* (2013.01); *G06F 2201/81* (2013.01)

(58) Field of Classification Search
CPC ............. G06F 11/3447; G06F 11/0709; G06F 11/3476; G06F 2201/81
See application file for complete search history.

(56) References Cited

FOREIGN PATENT DOCUMENTS

| | | |
|---|---|---|
| JP | 6-243064 A | 9/1994 |
| JP | 2002-132340 A | 5/2002 |
| JP | 2003-263342 A | 9/2003 |
| JP | 2005-101854 A | 4/2005 |
| JP | 2009-76056 A | 4/2009 |
| JP | 2009-199533 A | 9/2009 |
| JP | 2010-186310 A | 8/2010 |
| JP | 2011-230634 A | 11/2011 |
| WO | 2010/032701 A1 | 3/2010 |
| WO | 2011/065196 A1 | 6/2011 |

OTHER PUBLICATIONS

Japanese Office Action for JP Application No. 2013-529952 mailed on Jun. 17, 2014 with English Translation.

Hiroaki Meguro et al., "Network Anomaly Detection Based on Anomaly Duration", Proceedings of the 2007 IEICE General Conference Tsushin 2, B-7-70, The Institute Electronics, Information and Communication Engineers, Mar. 7, 2007, pp. 160. See doc on p. 1 of translated ISR for explanation of relevance.

International Search Report for PCT Application No. PCT/JP2012/069931, mailed on Sep. 11, 2012.

* cited by examiner

Fig. 4

| TIME | METRIC $x_1$ | METRIC $x_2$ | METRIC $x_3$ | ... |
|---|---|---|---|---|
| 2011/8/1 10:00 | 15 | 300 | 32 | |
| 2011/8/1 10:10 | 18 | 361 | 35 | |
| 2011/8/1 10:20 | 22 | 425 | 41 | |
| 2011/8/1 10:30 | 20 | 398 | 40 | |
| .. | .. | .. | .. | .. |

121

Fig.6
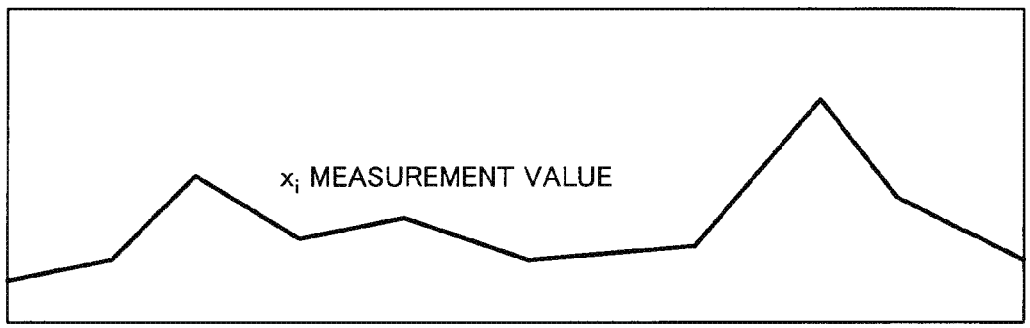
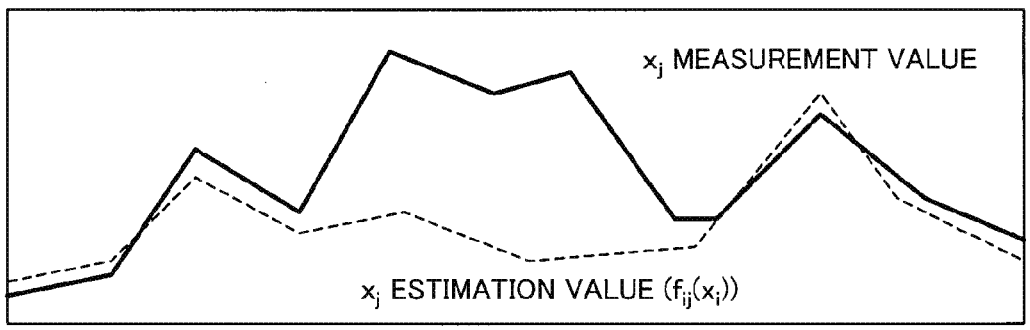
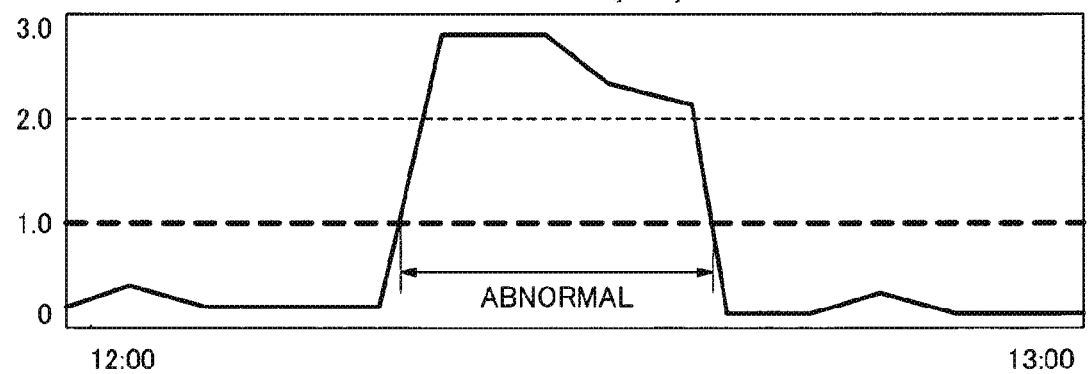

123

| TIME | | 11:50 | 12:00 | 12:10 | 12:20 | 12:30 | 12:40 | 12:50 |
|---|---|---|---|---|---|---|---|---|
| CORRELATION $x_1$ to $x_2$ | RESIDUAL ERROR/ THRESHOLD VALUE($d_{12}$/$Th_{12}$) | 1.2 | 0.3 | 0.5 | 2.8 | 2.5 | 2.4 | 0.3 |
| | ABNORMALITY HAS OCCURRED | yes | no | no | yes | yes | yes | no |
| CORRELATION $x_1$ to $x_3$ | RESIDUAL ERROR/ THRESHOLD VALUE($d_{13}$/$Th_{13}$) | 0.0 | 0.0 | 0.4 | 0.0 | 8.5 | 0.6 | 0.3 |
| | ABNORMALITY HAS OCCURRED | no | no | no | no | yes | no | no |
| CORRELATION $x_1$ to $x_4$ | RESIDUAL ERROR/ THRESHOLD VALUE($d_{14}$/$Th_{14}$) | 0.0 | 0.0 | 0.0 | 0.0 | 0.6 | 0.0 | 0.0 |
| | ABNORMALITY HAS OCCURRED | no | no | no | no | no | no | no |
| .. | .. | .. | .. | .. | .. | .. | .. | .. |

Fig. 8

| | TIME | 11:50 | 12:00 | 12:10 | 12:20 | 12:30 | 12:40 | 12:50 |
|---|---|---|---|---|---|---|---|---|
| CORRELATION $X_1$ to $X_2$ | RESIDUAL ERROR/ THRESHOLD VALUE($d_{12}/Th_{12}$) | 1.2 | 0.3 | 0.5 | 2.8 | 2.5 | 2.4 | 0.3 |
| | ABNORMALITY HAS OCCURRED | yes | no | no | yes | yes | yes | no |
| | ABNORMALITY CONTINUITY LEVEL($c_{12}$) | 1.00 | 0.83 | 0.67 | 0.67 | 0.67 | 0.67 | 0.5 |
| | $s_{12}$ | 1.2 | 0.0 | 0.0 | 1.8 | 1.7 | 1.6 | 0.0 |
| CORRELATION $X_1$ to $X_3$ | RESIDUAL ERROR/ THRESHOLD VALUE($d_{13}/Th_{13}$) | 0.0 | 0.0 | 0.4 | 0.0 | 8.5 | 0.6 | 0.3 |
| | ABNORMALITY HAS OCCURRED | no | no | no | no | yes | no | no |
| | ABNORMALITY CONTINUITY LEVEL($c_{13}$) | 0.0 | 0.0 | 0.0 | 0.0 | 0.17 | 0.17 | 0.17 |
| | $s_{13}$ | 0.0 | 0.0 | 0.0 | 0.0 | 1.4 | 0.0 | 0.0 |
| CORRELATION $X_1$ to $X_4$ | RESIDUAL ERROR/ THRESHOLD VALUE($d_{14}/Th_{14}$) | 0.0 | 0.0 | 0.0 | 0.0 | 0.6 | 0.0 | 0.0 |
| | ABNORMALITY HAS OCCURRED | no | no | no | no | no | no | no |
| | ABNORMALITY CONTINUITY LEVEL($c_{14}$) | 0.0 | 0.0 | 0.0 | 0.0 | 0.0 | 0.0 | 0.0 |
| | $s_{14}$ | 0.0 | 0.0 | 0.0 | 0.0 | 0.0 | 0.0 | 0.0 |
| .. | .. | .. | .. | .. | .. | .. | .. | .. |

Fig. 9

| TIME | | 11:50 | 12:00 | 12:10 | 12:20 | 12:30 | 12:40 | 12:50 |
|---|---|---|---|---|---|---|---|---|
| ABNORMALITY SCORE | METRIC $x_1$ | 0.30 | 0.00 | 0.00 | 0.30 | 0.40 | 0.20 | 0.00 |
| | METRIC $x_2$ | 0.00 | 0.00 | 0.00 | 0.00 | 0.23 | 0.00 | 0.00 |
| | METRIC $x_3$ | 0.00 | 0.00 | 0.00 | 0.00 | 0.20 | 0.00 | 0.00 |

Fig. 12

| TIME | 12:00 | 12:10 | 12:20 | 12:30 | 12:40 | 12:50 |
|---|---|---|---|---|---|---|
| GROUP A | | | $x_1$ | $x_1$ | $x_1$ | |
| ABNORMAL SCORE | | | 0.30 | 0.40 | 0.20 | |
| GROUP B | | | | $x_2, x_3$ | | |
| ABNORMAL SCORE | | | | 0.43 | | |

OPERATION MANAGEMENT DEVICE, OPERATION MANAGEMENT METHOD

TECHNICAL FIELD

The invention relates to an operation management apparatus, an operation management method, and a program, in particular an operation management apparatus, an operation management method, and a program which detect an abnormality of a system.

BACKGROUND ART

In an IT (Information Technology) system, a manager monitors the system, and avoids a fatal situation such as a system shutdown, by prioritizing detected abnormalities, when occurrence of a system abnormality is recognized.

Patent literatures 1 and 2 describe examples of operation management systems detecting the abnormality of the IT system. The operation management systems described in patent literatures 1 and 2 detect a correlation with respect to each of combinations of metrics, on the basis of a measurement value of a plurality of the metrics (performance indexes) of the system, and generate a correlation model. The operation management systems determine whether correlation destruction has occurred or not with respect to an inputted measurement value of the metrics using the generated correlation model to detect a system abnormality.

In the operation management system, a graph showing the number of correlation destructions with time, which is used by a manager to determine whether a system abnormality has occurred, is outputted. A list of the metrics in which the abnormality is detected (abnormal metrics) is also outputted with an abnormality score, as details of the abnormality at a given time.

As a related technology, patent literature 3 discloses a monitoring device which detects a monitoring item and a threshold value from resource items of a system by using a statistics technique.

CITATION LIST

Patent Literature

[Patent literature 1] Japanese Patent Application Laid-Open 2009-199533
[Patent literature 2] Japanese Patent Application Laid-Open 2010-186310
[Patent literature 2] Japanese Patent Application Laid-Open 2003-263342

SUMMARY OF INVENTION

Technical Problem

In the operation management system described in patent literatures 1 and 2, as a system size increases, the number of metrics increases and a large amount of abnormal metrics are presented. In the abnormal metrics, a metric, in which an abnormality of low importance level (emergency level) has occurred, is included. That is, a metric, in which an abnormality that a manager does not need to take notice such as an abnormality which disappears in a short time due to background processing or the like has occurred, is included. Therefore, when a large number of abnormal metrics have occurred, it becomes difficult to grasp a metric in which an abnormality of high importance level (emergency level) such as a continuous abnormality for a long time has occurred.

An object of the invention is to solve the above mentioned problem and to provide an operation management apparatus, an operation management method, and a program to grasp a metric in which a continuous abnormality has occurred in a system, easily.

Solution to Problem

An operation management apparatus according to an exemplary aspect of the invention includes: a metric collection means for collecting a measured value of each of a plurality of metrics in a system sequentially; and an abnormality score calculation means for calculating and outputting, on the basis of a continuity level indicating a degree of continuity of an abnormality of the measurement value for each of the plurality of metrics at each time, an abnormality score for the metric.

An operation management method according to an exemplary aspect of the invention includes: collecting a measured value of each of a plurality of metrics in a system sequentially; and calculating and outputting, on the basis of a continuity level indicating a degree of continuity of an abnormality of the measurement value for each of the plurality of metrics at each time, an abnormality score for the metric.

A computer readable storage medium according to an exemplary aspect of the invention, records thereon a program, causing a computer to perform a method including: collecting a measured value of each of a plurality of metrics in a system sequentially; and calculating and outputting, on the basis of a continuity level indicating a degree of continuity of an abnormality of the measurement value for each of the plurality of metrics at each time, an abnormality score for the metric.

Advantageous Effect of Invention

The advantageous effect of the invention is to grasp a continuous abnormality of a metric in a system, easily.

BRIEF DESCRIPTION OF DRAWINGS

FIG. 4 is a diagram showing an example of sequential performance information 121 in the first exemplary embodiment of the present invention.
FIG. 6 is a diagram showing an example of a residual error in the first exemplary embodiment of the present invention.

FIG. 8 is a diagram showing a calculation process of an abnormality score in the first exemplary embodiment of the present invention.

FIG. 9 is a diagram showing a calculation result of the abnormality score in the first exemplary embodiment of the present invention.

FIG. 12 is a diagram showing a calculation result of a group abnormality score in the second exemplary embodiment of the present invention.

DESCRIPTION OF EMBODIMENTS (First Exemplary Embodiment)

Next a first exemplary embodiment of the present invention will be described.

Figure 2:
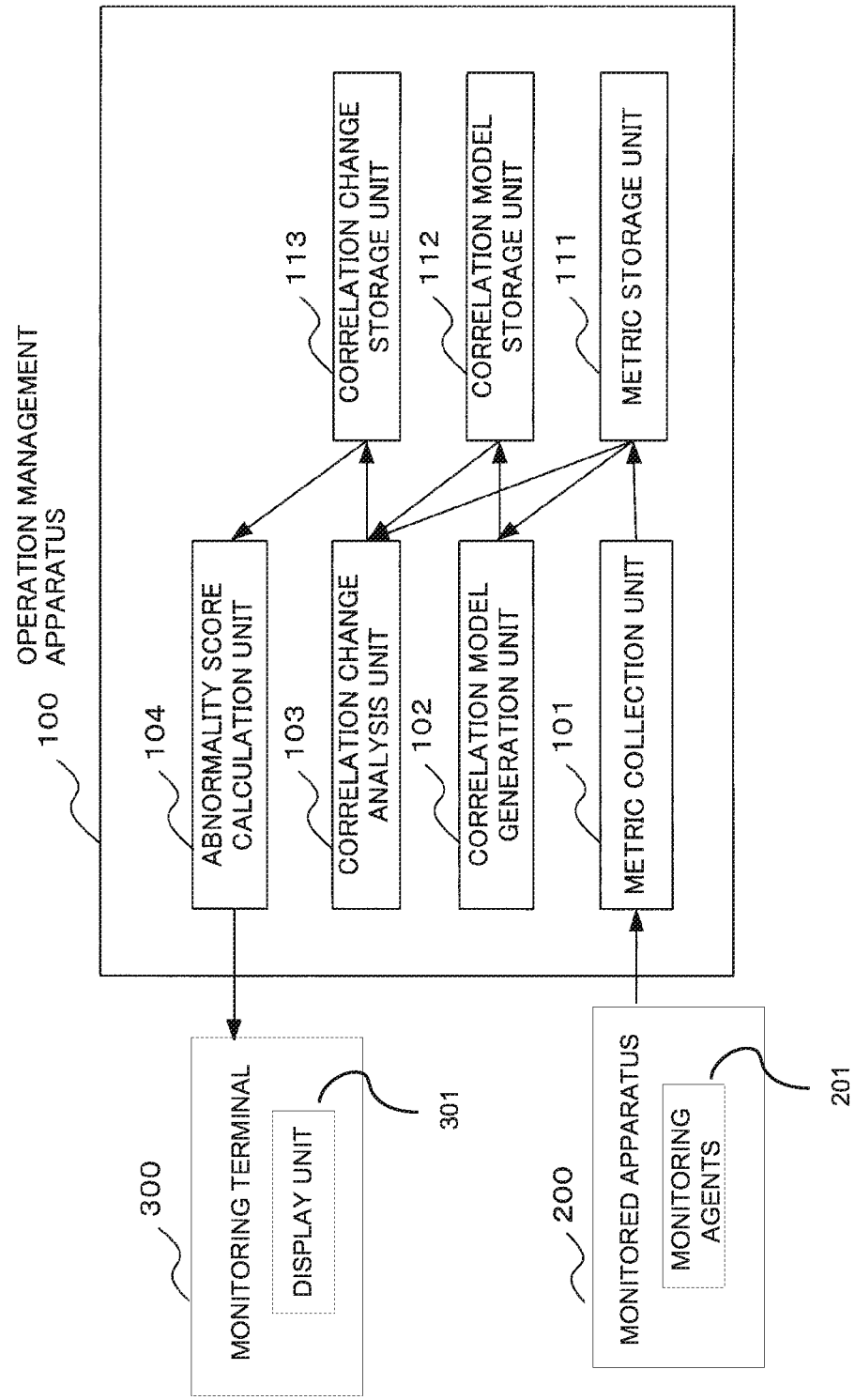
FIG. 2 is a block diagram showing a configuration of an operation management system to which an operation management apparatus 100 of the first exemplary embodiment of the present invention is applied.

Initially, a configuration of the first exemplary embodiment of the present invention will be described. FIG. 2 is a block diagram showing a configuration of an operation management system to which an operation management apparatus 100 of the first exemplary embodiment of the present invention is applied.

Referring to FIG. 2, the operation management system of the first exemplary embodiment of the present invention includes an operation management apparatus 100, one or more monitored apparatuses 200, and a monitoring terminal 300. The operation management apparatus 100 and the monitored apparatus 200 are connected by a network. The operation management apparatus 100 and the monitoring terminal 300 are also connected by a network.

The monitored apparatus 200 is an apparatus, such as a Web server or a Database server, which composes a system. Each monitored apparatus 200 includes a monitoring agent 201.

The monitoring agent 201 of the monitored apparatus 200 measures actual measurement data (measurement values) of performance values of a plurality of items in the monitored apparatus 200 at a regular time interval, and sends the measurement data to the operation management apparatus 100. As an item of the performance value, a computer resource usage rate or a computer resource amount, such as a CPU (Central Processing Unit) usage rate, a memory usage rate, or a disc access frequency is used.

Here, a set of the monitored apparatus 200 and the item of a performance value is defined as a metric (performance index), and a set of values of a plurality of metrics which are measured at the same time is defined as performance information. The metric is represented by using a numerical value of an integer or a decimal number. The metric corresponds to the element in patent literature 1.

The operation management apparatus 100 generates a correlation model 122 for the monitored apparatus 200 on the basis of the performance information collected from the monitored apparatus 200 which is a monitoring target, and detects a failure or an abnormality of the monitored apparatus 200 using the generated correlation model 122.

The operation management apparatus 100 includes a metric collection unit 101, a correlation model generation unit 102, a correlation change analysis unit 103, an abnormality score calculation unit 104, a metric storage unit 111, a correlation model storage unit 112, and a correlation change storage unit 113.

The metric collection unit 101 collects the performance information from the monitored apparatus 200, and stores time-series change thereof, as a sequential performance information 121, in the metric storage unit 111.

The correlation model generation unit 102 generates the correlation model 122 of the system composed of the monitored apparatuses 200 on the basis of the sequential performance information 121.

The correlation model storage unit 112 stores the correlation model 122 generated by the correlation model generation unit 102.

The correlation change analysis unit 103 detects an abnormality of a correlation for each combination of metrics included in the correlation model 122, with respect to newly inputted performance information, as described in patent literature 1.

The correlation change storage unit 113 stores the detection result of the abnormality of a correlation by the correlation change analysis unit 103, as correlation change information 123.

The abnormality score calculation unit 104 calculates an abnormality score of each metric on the basis of the correlation change information 123 and outputs the calculated abnormality score to the monitoring terminal 300.

The monitoring terminal 300 is a terminal which is used when the operation management apparatus 100 receives instructions for detecting a failure or an abnormality of the monitored apparatus 200 from a manager or the like, and outputs the detection result. The monitoring terminal 300 includes a display unit 301.

The display unit 301 of the monitoring terminal 300, which is a display device such as a display, outputs (displays) the abnormality score outputted by the operation management apparatus 100 to the manager or the like by using a display screen.

Note that the operation management apparatus 100 may be a computer which includes a CPU and a storage medium storing programs and operates according to the control based on the programs. Moreover, the metric storage unit 111, the correlation model storage unit 112, and the correlation change storage unit 113 are separated each other or are included in one storage medium.

Next, an operation of the operation management apparatus 100 of the first exemplary embodiment of the present invention will be explained.

Figure 3:
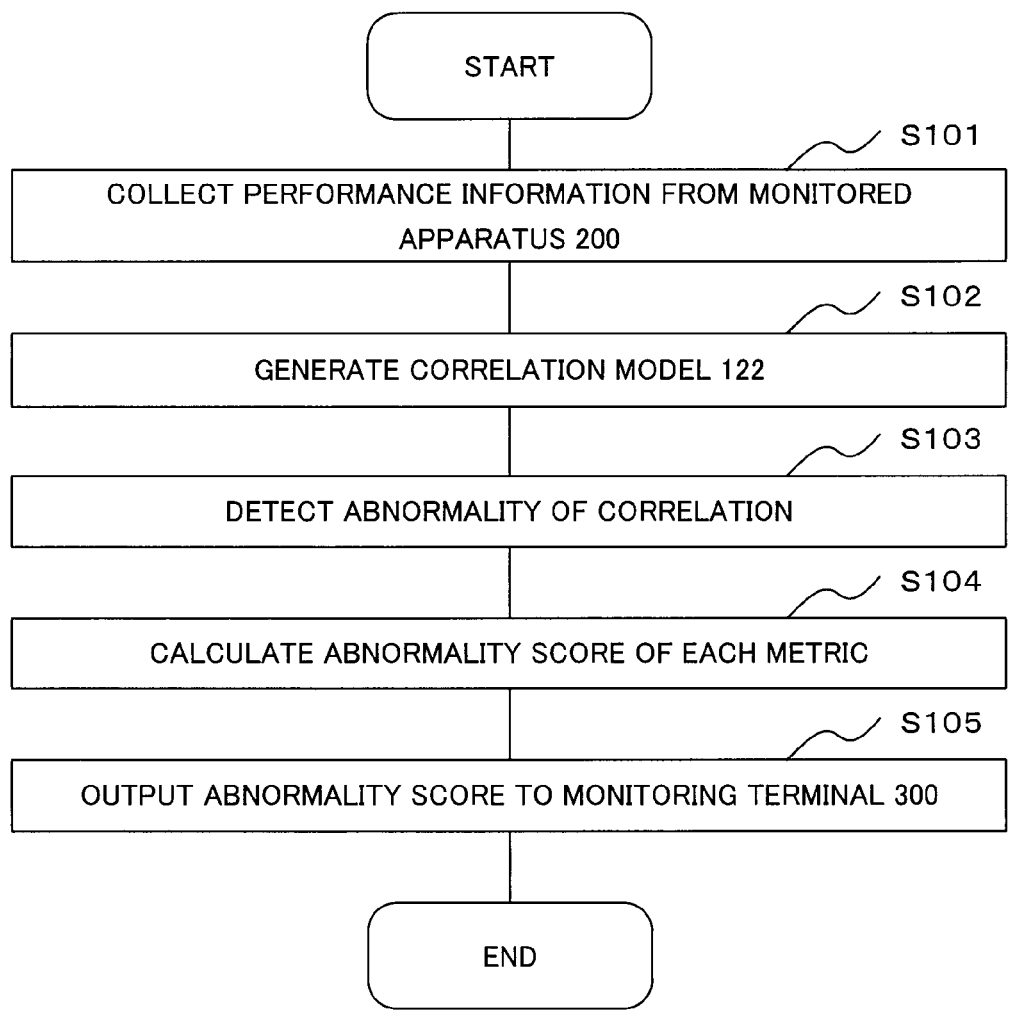
FIG. 3 is a flowchart showing a processing of the operation management apparatus 100 in the first exemplary embodiment of the present invention.

FIG. 3 is a flowchart showing processing of the operation management apparatus 100 of the first exemplary embodiment of the present invention.

Initially, the metric collection unit 101 of the operation management apparatus 100 collects performance information measured by the monitoring agent 201 on the monitored apparatus 200, and stores the collected performance information in the metric storage unit 111 (step S101).

FIG. 4 is a diagram showing an example of the sequential performance information 121 of the first exemplary embodiment of the present invention. In the example of FIG. 4, the sequential performance information 121 includes a time-series change of measurement values of metrics $x\_1$, $x\_2$, $x\_3$, . . . (hereinafter, a character following "_" indicates a suffix).

For example, the metric collection unit 101 stores the sequential performance information 121 shown in FIG. 4.

Next, the correlation model generation unit 102 refers to the sequential performance information 121 of the metric storage unit 111, generates the correlation model 122 on the basis of performance information in a predetermined modeling period specified by the manager or the like, and stores the generated correlation model 122 in the correlation model storage unit 112 (step S102).

The correlation model 122 includes a correlation function (or conversion function) and a threshold value for each of all combinations of two metrics in a plurality of metrics.

The correlation function is a function showing a correlation, with respect to time-series data of measurement values in the predetermined modeling period (t_s≤t≤t_e, t represents time), for each combination of metrics by using a predetermined approximation formula. If a correlation function of a correlation from metric x_i to metric x_j is described as f_i,j, an estimation value of one metric x_j of the combination, is represented based on a measurement value of the other metric x_i, by using the correlation function f_i, j, as Equation 1.

$$\text{estimation value of } x_j(t) = f_{i,j}(x_i(t, t-1, t-2, \ldots)) \quad \text{[Equation 1]}$$

The correlation model generation unit 102 determines a coefficient of the correlation function for each combination of metrics on the basis of the sequential performance information 121 in the predetermined modeling period. The coefficient of the correlation function is determined through system identification processing on a time-series of the measurement values of the metrics, as described in patent literature 1.

The threshold value is the maximum value of a residual error (conversion error, or prediction error) due to the correlation function in the predetermined modeling period with respect to each combination of metrics. The residual error is an absolute value of a difference between an estimation value of the metric calculated by using the correlation function and a measurement value of the metric.

The threshold value $Th_{i,j}$ and residual error $d_{i,j}(t)$ for the correlation from metric x_i to metric x_j is provided as Equation 2.

$$Th_{i,j} = \max_{t\_s \leq t \leq t\_e}(d_{i,j}(t))$$

$$d_{i,j}(t) = \text{abs}(x_j(t) - f_{i,j}(x_i(t, t-1, t-2, \ldots))) \quad \text{[Equation 2]}$$

Note that abs( ) shows an absolute value of a value in the parentheses.

Here, it is assumed that, as long as the monitored apparatus 200 is in normal operation, a value of the residual error $d_{i,j}(t)$ is extremely small and does not exceed the threshold value $Th_{i,j}$.

The correlation model generation unit 102 may calculate a weight of a correlation function for each combination of metrics on the basis of a residual error in the predetermined modeling period, and determine a set of the correlation functions whose weight is equal to or greater than a predetermined value and threshold values thereof, as the correlation model 122, as described in patent literature 1.

Figure 5:
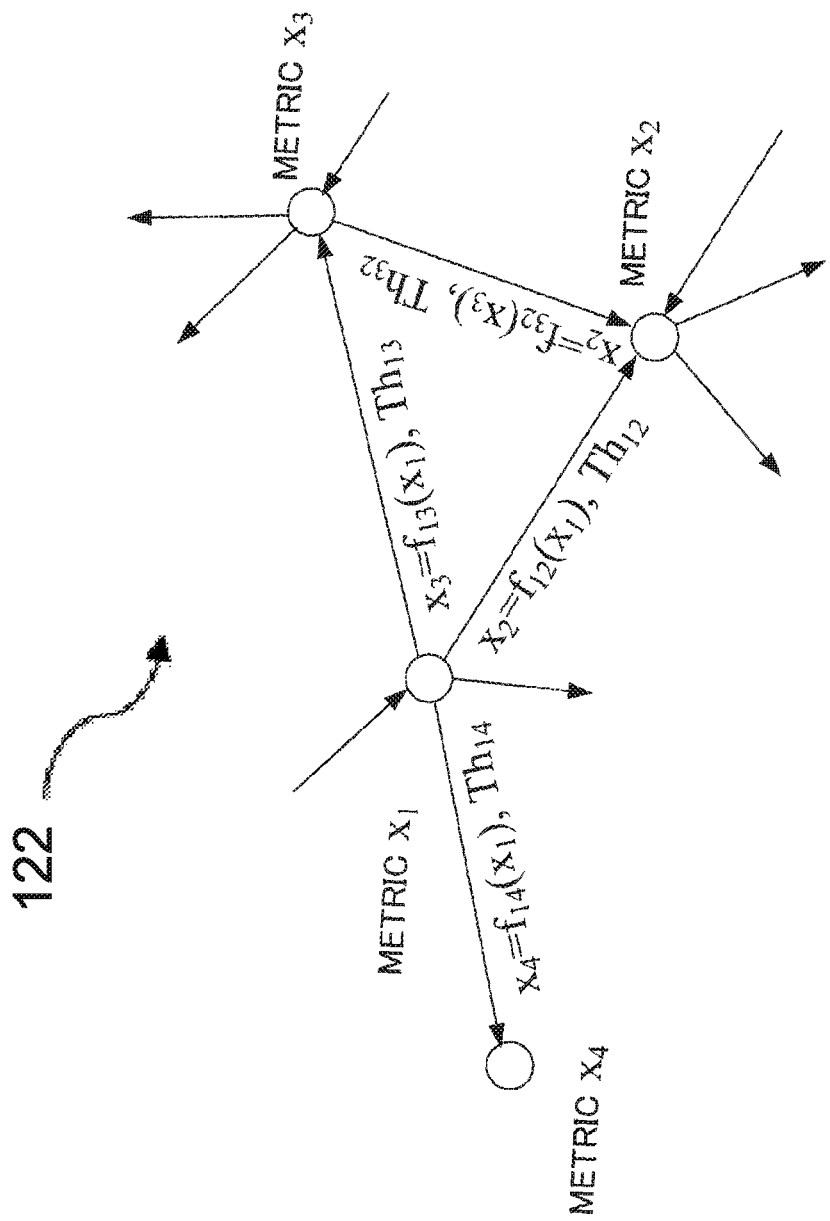
FIG. 5 is a diagram showing an example of a correlation model 122 in the first exemplary embodiment of the present invention.

FIG. 5 is a diagram showing an example of the correlation model 122 of the first exemplary embodiment of the present invention. In the example of FIG. 5, the correlation model 122 includes correlation functions among metrics x_1, x_2, x_3, . . . , and the threshold values.

For example, the correlation model generation unit 102 generates the correlation model 122 shown in FIG. 5 on the basis of the sequential performance information 121 of FIG. 4.

Next the correlation change analysis unit 103 detects an abnormality of a correlation included in the correlation model 122 with respect to performance information newly collected by the metric collection unit 101 at each time, and stores the correlation change information 123 in the correlation change storage unit 113 (step S103).

Here, the correlation change analysis unit 103 determines whether an abnormality (correlation destruction) has occurred or not for each correlation included in the correlation model 122, with respect to the newly inputted performance information, as described in patent literature 1.

An abnormality level showing a degree of the abnormality of the correlation is indicated by a residual error calculated by using the newly inputted performance information and the correlation model 122. The correlation change analysis unit 103 determines whether an abnormality of a correlation from metric x_i to metric x_j on the basis of Equation 3, using the residual and the threshold value.

$$d_{i,j}(t)/Th_{i,j} \geq 1 \ldots \text{abnormal}$$

$$d_{i,j}(t)/Th_{i,j} < 1 \ldots \text{not abnormal} \quad \text{[Equation 3]}$$

FIG. 6 is a diagram showing an example of a residual error in the first exemplary embodiment of the present invention. In the example of FIG. 6, in case a ratio of the residual error between the estimation value and the measurement value of metric x_j to the threshold value exceeds 1, it is determined that an abnormality has occurred in the correlation from metric x_i to metric x_j.

Figure 7:
FIG. 7 is a diagram showing an example of correlation change information 123 in the first exemplary embodiment of the present invention.

FIG. 7 is a diagram showing an example of the correlation change information 123 in the first exemplary embodiment of the present invention. The correlation change information 123 includes a ratio of the residual error to the threshold value $(d_{i,j}(t)/Th_{i,j})$ at each time and information indicating whether an abnormality has occurred or not.

For example, the correlation model generation unit 102 detects an abnormality of correlation included in the correlation model 122 shown in FIG. 5 with respect to the newly collected performance information and stores the correlation change information 123 shown in FIG. 7.

The abnormality score calculation unit 104 calculates an abnormality score of each metric on the basis of the correlation change information 123 at each time (step S104).

Here, the abnormality score is calculated on the basis of the abnormality level of the correlation (residual error) related to each metric and a degree of continuity of the abnormality. The abnormality score calculation unit 104 calculates the abnormality score $S_i(t)$ of metric x_i on the basis of Equation 4.

$$S_i(t) = \text{average}_j(s_{i,j}(t)) \quad \text{[Equation 4]}$$

$$s_{i,j}(t) = d_{i,j}(t)/Th_{i,j} \times \text{step}(d_{i,j}(t)/Th_{i,j}) \times c_{i,j}(t)$$

$$\text{step}(y) = \begin{cases} 1 & \text{if}(y \geq 1) \\ 0 & \text{else} \end{cases}$$

Here, average_i( ) indicates to obtain average of values in the parentheses calculated for all of the correlations between metric x_i and the other metrics with which metric x_i has a correlation. For example, when correlations between metric x_1 and metrics x_2, x_3, x_4 exist, an average value of the values in the parentheses for these correlations is calculated.

$c_{i,j}(t)$ is an abnormality continuity level indicating a degree of continuity of the abnormality, that is, a ratio of a length of time period during which the abnormality of the correlation is detected within a predetermined length of time period until time t.

step (y) is a step function, and is equal to 0 when a ratio of the residual error to the threshold value calculated by formula 3 is less than 1, that is, the correlation is in normal. Therefore, when all the correlations between metric x_i and the other metrics with which metric x_i has a correlation are in normal, the abnormality score S_i(t) is equal to 0.

FIG. 8 is a diagram showing a calculation process of the abnormality score in the first exemplary embodiment of the present invention. FIG. 9 is a diagram showing a calculation result of the abnormality score in the first exemplary embodiment of the present invention.

For example, the abnormality score calculation unit 104 calculates the abnormality continuity level shown in FIG. 8, at each time, on the basis of the correlation change information 123 shown in FIG. 7, and calculates the abnormality score shown in FIG. 9.

In the calculation result of the abnormality score in FIG. 9, it is likely that, at 12:30, an abnormality level of metric x_1 is large or the abnormality of metric x_1 continues to exist since an abnormality score of metric x_1 is greater than abnormality scores of metric x_2 and metric x_3, for example.

Next, the abnormality score calculation unit 104 generates an analysis result 130 including an abnormality score of each metric and outputs the generated analysis result 130 to the monitoring terminal 300, at each time (step S105). The display 301 of the monitoring terminal 300 displays the analysis result 130 to a manager or the like.

Figure 10:
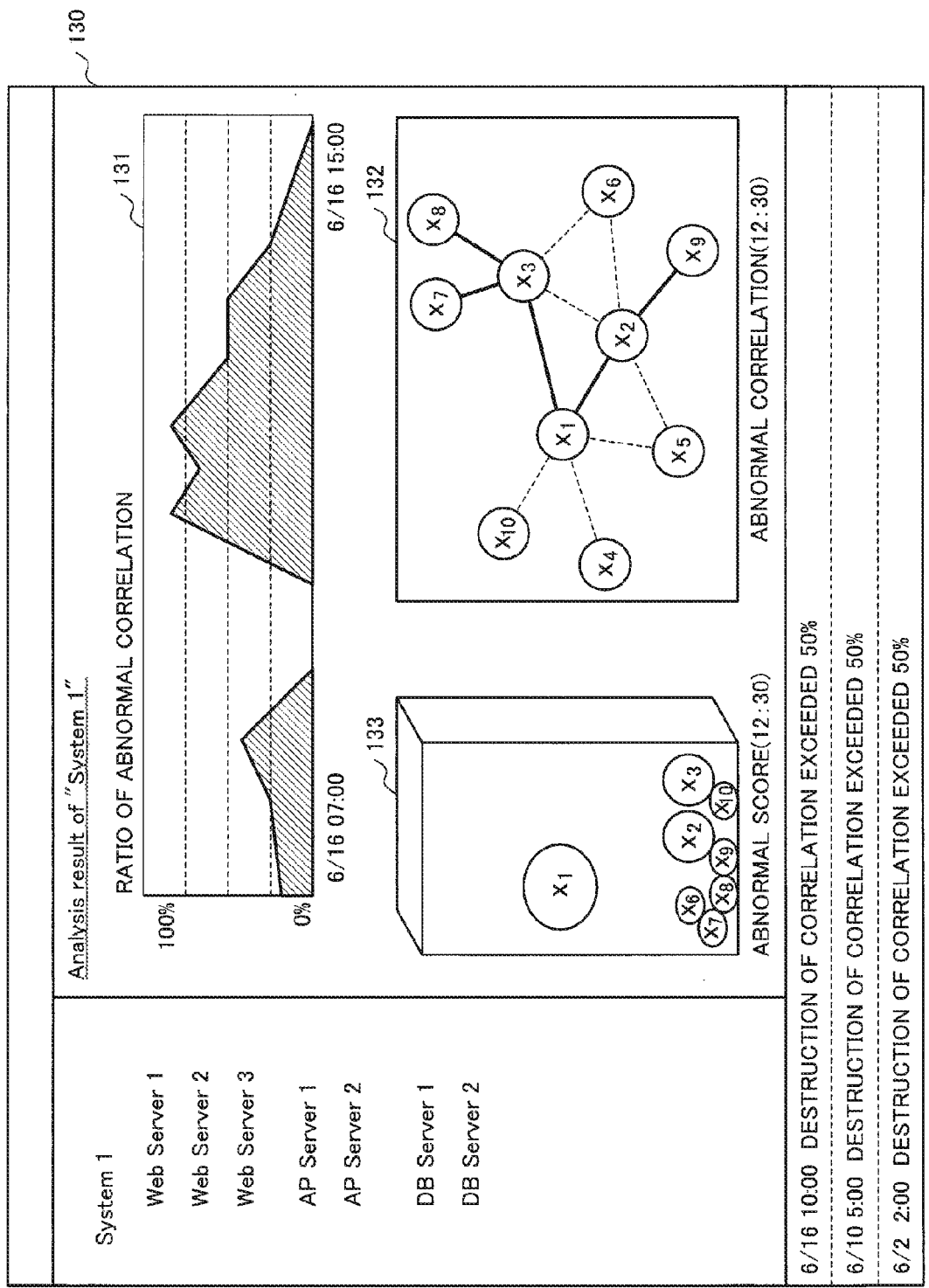
FIG. 10 is a diagram showing an example of an analysis result 130 in the first exemplary embodiment of the present invention.

FIG. 10 is a diagram showing an example of the analysis result 130 in the first exemplary embodiment of the present invention. In the example in FIG. 10, the analysis result 130 includes an abnormality correlation ratio display unit 131, an abnormality correlation display unit 132, and an abnormality score display unit 133.

For example, the abnormality score calculation unit 104 transmits the analysis result 130 shown in FIG. 10 to the monitoring terminal 300.

The abnormality correlation ratio display unit 131 displays a ratio of the number of correlations determined as being in abnormal to the number of correlations included in the correlation model 122 with time. The manager or the like can grasp the time at which abnormalities of a large number of correlations have occurred in the monitored apparatus 200, by referring to the abnormality correlation ratio display unit 131.

The abnormality correlation display unit 132 displays a correlation determined as being in abnormal in the correlation model 122. In the abnormality correlation display unit 132, each metric in the correlation model 122 is represented by a circle with an identifier (name) of the metric and the correlation determined as being in abnormal is represented by a solid line connecting a circle with another circle. The abnormality correlation display unit 132 displays the correlation determined as being in abnormal, with respect to the time designated by the manager or the like on the abnormality correlation ratio display unit 131, for example. The abnormality correlation display unit 132 may display the correlation determined as being in abnormal, with respect to the latest collection time, every time new performance information is collected. A manager can grasp a metric to which abnormalities are concentrated in the monitored apparatus 200 by referring to the abnormality correlation display unit 132.

The abnormality score display unit 133 displays an abnormality score of each metric. Each metric is represented as a circle with an identifier of the metric in a predetermined rectangular area, and as the abnormality score becomes larger, a size (radius) of the circle becomes larger. In addition, as the abnormality score becomes larger, the circle is displayed at an upper part of the rectangular area.

The abnormality score calculation unit 104 determines a size of the circle, which becomes larger depending on the abnormality score, and a height from a base of the rectangular area on the perpendicular axis to the base, which becomes higher depending on the abnormality score. Then, the abnormality score calculation unit 104 generates data to display the abnormality score display unit 133 showing the circle with the determined size and height.

The abnormality score display unit 133 may display the abnormality score, with respect to the time designated by the manager or the like on the abnormality correlation ratio display unit 131, for example. The abnormality score display unit 133 may display the abnormality score with respect to the latest collection time, every time new information is collected.

As described in Equation 4, the abnormality score is calculated by multiplying an abnormality level (residual error) of a correlation by an abnormality continuity level. Since the abnormality continuity level is a ratio of a length of time period during which the abnormality is detected within a predetermined length of time period until the time at which the abnormality score is calculated, the abnormality score gradually increases as time passes if the abnormality continues to exist and the abnormality score gradually decreases as time passes if the abnormality has disappeared. In the abnormality score display unit 133, if the abnormality of a metric continues to exist, a circle of the metric moves upward in the rectangular area, while gradually enlarging, and if the abnormality has disappeared, the circle of the metric moves downward in the rectangular area, while gradually shrinking. That is, in the abnormality score display unit 133, the abnormality score of each metric is displayed as a movement which is similar to a movement of an object having a buoyant force, just like a balloon or a bubble. The upward movement and the downward movement of the circle in the rectangular area may follow the principle of Archimedes.

In the analysis result 130 in FIG. 10, at 12:30, the circle representing metric x_1 is larger than circles of the other metrics, and displayed at the upper part. Thereby, a manager can easily grasp that it is likely that the abnormality level of metric x_1 is large or the abnormality of metric x_1 continues to exist.

In the calculation result of the abnormality score in FIG. 9, the abnormality of metric x_1 continues to exist from 12:20 to 12:40, and the abnormality score reaches its peak at 12:30. In this case, in the abnormality score display unit 133, the circle representing the metric x_1 moves upward while enlarging from 12:20 to 12:30, and moves downward while shrinking from 12:30 to 12:40. Thereby, the manager or the like can easily grasp start or stop of the continuous abnormality of metric x_1.

As above described, the operation of the first exemplary embodiment of the present invention is completed.

Figure 1:
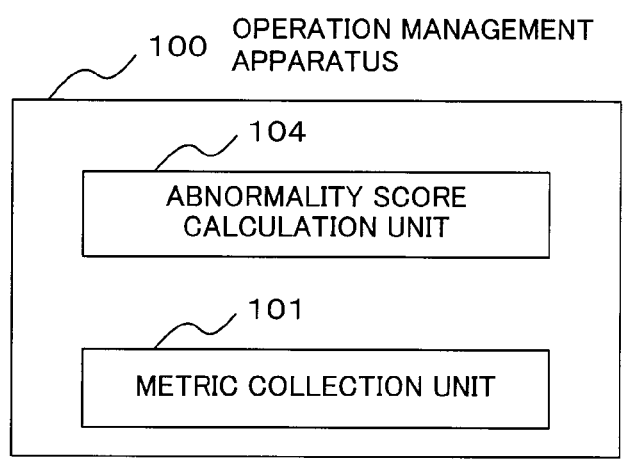
FIG. 1 is a block diagram showing a characteristic configuration according to a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, an operation management apparatus 100 includes a metric collection unit 101 and an abnormality score calculation unit 104.

The metric collection unit 101 collects a measured value of each of a plurality of metrics in a system sequentially. The abnormality score calculation unit 104 calculates and outputs, on the basis of a continuity level indicating a degree of continuity of an abnormality of the measurement value for each of the plurality of metrics at each time, an abnormality score for the metric.

Next, an advantageous effect of the first exemplary embodiment of the present invention will be described.

In the technology described in patent literature 1, the abnormality score of metric $x\_i$ at a given time is calculated on the basis of the number of correlations which is determined as being in abnormal at the time in the correlations from metric $x\_1$ to the other metrics, and a list of the abnormal metrics is displayed with abnormality scores. A manager or the like preferentially handles the abnormality of the metric with high abnormality score on the basis of the list of the abnormal metrics. In this case, since the manager or the like cannot grasp whether the abnormality of the metric is continuous or temporary, the manager or the like may preferentially handles the abnormality of the metric even if the abnormality of the metric is temporary. In order to grasp whether the abnormality of the metric is continuous or temporary, the manager or the like has to compare, for example, the list of the abnormal metrics at the time with lists thereof before and after the time.

According to the first exemplary embodiment of the present invention, it is possible to grasp the continuous abnormality of the metric in the system, easily. The reason is that the abnormality score calculation unit 104 calculates the abnormality score of the metric on the basis of a continuity level indicating a degree of continuity of the abnormality of the metric at each time. Further, the reason is that the abnormality score calculation unit 104 displays the abnormality score of each metric by using a figure with a size and a display position depending on the abnormality score.

Thereby, the manager or the like can preferentially handle the continuous abnormality of the metric, and a stable operation of the system is expected compared with the case in which only the technology of patent literature 1 is used.

Thereby, in order to investigate whether or not the abnormality of the metric is continuous, the manager or the like does not need to compare the lists of the abnormal metrics at each time, and reduction of manager's burden for grasping the continuous abnormality and prevention of overlooking are expected.

According to the first exemplary embodiment of the present invention, start or stop of continuous abnormality of the metric can be grasped easily. The reason is that the abnormality score calculation unit 104 displays the abnormality score of each metric by using a figure with a size and a display position depending on the abnormality score.

(Second Exemplary Embodiment)

Next, a second exemplary embodiment of the present invention will be described.

The second exemplary embodiment of the present invention differs from the first exemplary embodiment in that the abnormality score calculation unit 104 groups metrics having the same start time of abnormality detection.

A configuration of the second exemplary embodiment of the present invention is the same as that of the first exemplary embodiment of the present invention.

Next, an operation of the operation management apparatus 100 in the second exemplary embodiment of the present invention will be explained.

Figure 11:
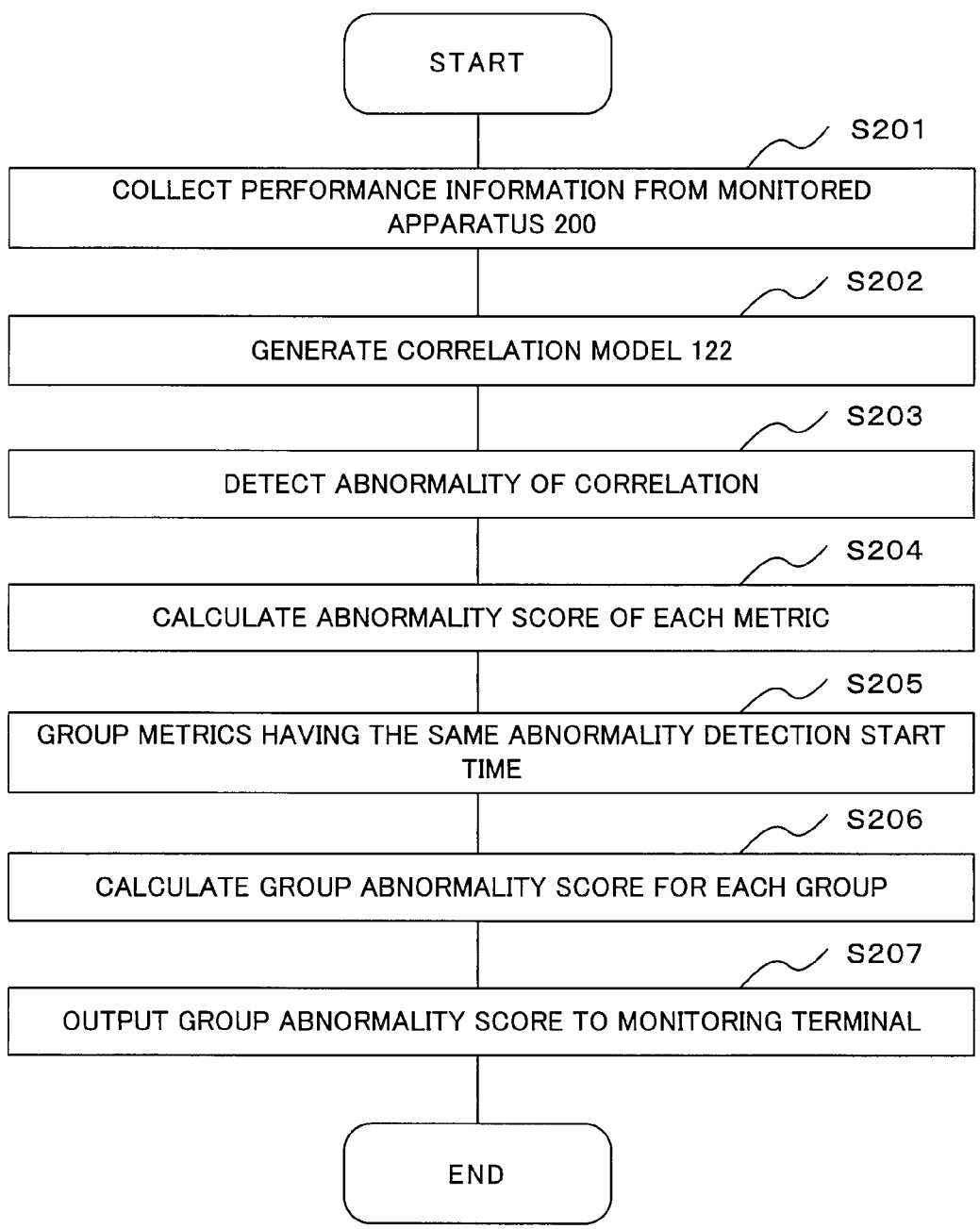
FIG. 11 is a flowchart showing processing of an operation management apparatus 100 in a second exemplary embodiment of the present invention.

FIG. 11 is a flowchart showing processing of the operation management apparatus 100 in the second exemplary embodiment of the present invention. Operations from collection of performance information by the metric collection unit 101 to calculation of an abnormality score of each metric by the abnormality score calculation unit 104 (steps S201 to S204) are similar to the operations of the first exemplary embodiment of the present invention (steps S101 to S104).

The abnormality score calculation unit 104 refers to the calculated abnormality score of each metric calculated in the above mentioned step S104, and groups the metrics having the same abnormality detection start time (step S205). The metrics having the same the abnormality detection start time are metrics whose abnormality score changes from 0 to a value greater than 0 at the same time. The abnormality score calculation unit 104 calculates a group abnormality score which is an abnormality score for each group by totalizing abnormality scores of metrics which are grouped (step S206).

FIG. 12 is a diagram showing a calculation result of the group abnormality score in the second exemplary embodiment of the present invention.

For example, the abnormality score calculation unit 104 calculates the group abnormality score shown in FIG. 12 on the basis of the abnormality score of FIG. 9, at each time.

In this case, the abnormality score calculation unit 104 generates, on the basis of an abnormality score at 12:20, a group A composed of only metric $x\_1$ whose abnormality detection starts at the time. The group A continues until 12:40. The abnormality score calculation unit 104 generates, on the basis of the abnormality score at 12:30, a group B composed of metric $x\_2$ and metric $x\_3$ whose abnormality detection starts at the time. The group B ends at 12:30. The abnormality score calculation unit 104 calculates, on the basis of the abnormality score of metrics included in each group, the group abnormality score shown in FIG. 12.

The calculation result of the group abnormality score in FIG. 12 shows that the abnormality detection start time of metric $x\_2$ is same as the abnormality detection start time of metric $x\_3$. It is likely that the abnormality of metric $x\_2$ and the abnormality of metric $x\_3$ are caused by a common abnormal event, and they are highly related each other. The calculation also shows that the abnormality detection start time of metric $x\_1$ is different from the abnormality detection start time of metrics $x\_2$ and $x\_3$.

The abnormality score calculation unit 104 generates an analysis result 140 including a group abnormality score of each group at each time and outputs the generated analysis result 140 to the monitoring terminal 300 (step S207).

Figure 13:
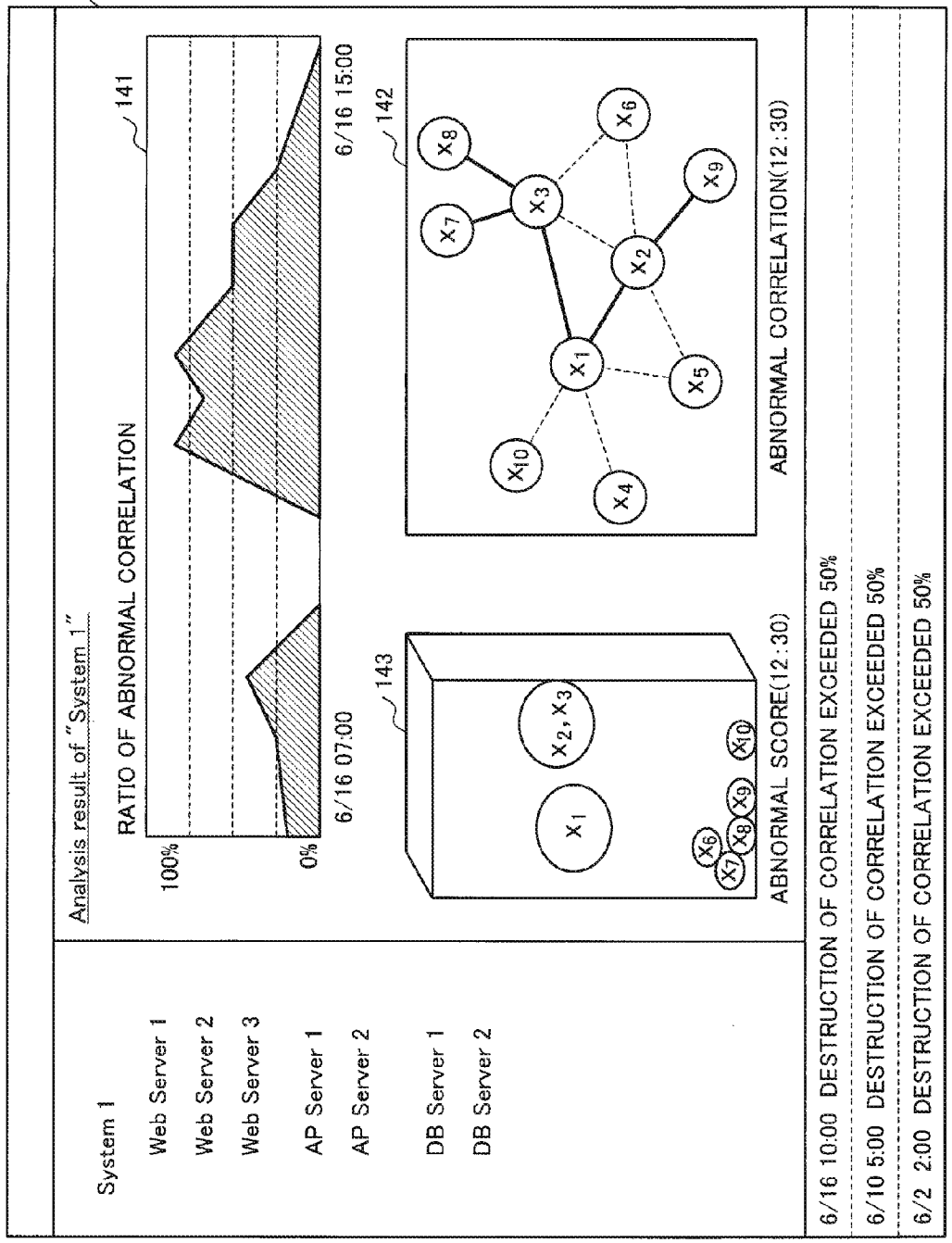
FIG. 13 is a diagram showing an example of an analysis result 140 in the second exemplary embodiment of the present invention.

FIG. 13 is a diagram showing an example of the analysis result 140 in the second exemplary embodiment of the present invention. In the example of FIG. 13, the analysis result 140 includes an abnormality correlation rate display unit 141, an abnormality correlation display unit 142, and an abnormality score display unit 143.

The abnormality correlation rate display unit 141 and the abnormality correlation display unit 142 displays a ratio of correlations determined as being in abnormal and a correlation determined as being in abnormal in the correlation model 122, respectively, as well as the abnormality correlation rate display unit 131 and the abnormality correlation display unit 132 of the first exemplary embodiment of the present invention.

The abnormality score display unit 143 displays the group abnormality score of each group. Each group is displayed in a given rectangular area, as a circle, with an identifier of a metric included in the group, and as the abnormality score becomes larger, the circle becomes larger and is displayed at the upper part of the rectangular area, as well as the first exemplary embodiment of the present invention.

In the analysis result 130 shown in FIG. 10 in the first exemplary embodiment of the present invention, since the abnormalities of metrics x_2 and x_3 do not have a continuity and the abnormality scores thereof are lower than that of the metric x_1 at 12:30, the circles representing metrics x_2 and x_3 are displayed at the lower part of the abnormality score display unit 133 with small size.

On the other hand, in the analysis result 140 shown in FIG. 13 in the second exemplary embodiment of the present invention, a circle representing a group composed of metrics x_2 and x_3 is displayed at the upper part of the abnormality score display unit 143 at 12:30, with larger size than circles of the other groups, as well as a circle representing a group composed of metric x_1. Thereby, the manager or the like can easily grasp that metric x_2 and metric x_3 are highly related to each other, the sum of the abnormalities thereof is large, or the abnormalities continue to exist.

As above described, the operation of the second exemplary embodiment of the present invention is completed.

Next, an advantageous effect of the second exemplary embodiment of the present invention will be described.

When a plurality of metrics have abnormal values due to one abnormal event, abnormalities of the plurality of metrics may occur at the same time. In the technology of patent literature 1, in order to grasp such abnormal event, a manager or the like has to confirm a temporal relation between the abnormal metrics, on the basis of a temporal change of an abnormal metrics list, for example, and extract abnormal metrics occurring at the same time. As another method to identify such abnormal event, a method applying signature matching with respect to a correlation on which an abnormality occurs is also proposed. However, the signature matching cannot be applied to an unknown abnormal event, since there is no accumulation of the signature regarding correlations for the unknown abnormal event.

According to the second exemplary embodiment of the present invention, abnormal metrics occurring at the same time can be easily grasped. The reason is that the abnormality score calculation unit 104 groups the metrics having the same abnormality detection start time, and calculates the group abnormality score of each group.

Thereby, a manager or the like can quickly grasp the abnormality due to the common abnormal event, and expect a stable operation of the system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the exemplary embodiments of the present invention, a performance index in the system is defined as a metric, and the abnormality score of the metric is calculated. However, any index which is represented as time series, such as requirements from a client computer in the system, the number of cargos processed at a unit time through the system, can be used as a metric.

In the exemplary embodiments of the present invention, as a degree of the abnormality of the metric, a degree of the abnormality of the correlation (correlation destruction) regarding the metric is used. However, a degree of another abnormality level, such as a degree of excess from a predetermined threshold for a value of the metric (threshold abnormality) can also be used.

In the exemplary embodiments of the present invention, the threshold value in the correlation model 122 is calculated with respect to each combination of metrics based on the maximum value of the residual error of the correlation function. However, the threshold value may be a predetermined value defined for each combination of metrics, or a predetermined value defined for the correlation model 122.

In the exemplary embodiments of the present invention, the abnormality score is calculated by using Equation 4. However, the abnormality score may be calculated by using other Equations as long as the abnormality score increases depending on a continuity degree of the abnormality of the metric. For example, in Equation 4, the abnormality score may be calculated by using only abnormality continuity level of the correlation on the metric, without using the abnormality level of the correlation (residual error) regarding the metric.

In the exemplary embodiments of the present invention, in the analysis results 130, 140, the abnormality score is indicated by a size of the circle representing the metric and the height at which the circle is displayed in the predetermined rectangular area. However, a figure with a different shape or a different display position may be used as long as the abnormality score is indicated. For example, the abnormality score may be indicated by a figure other than a circle, such as an ellipse or a sphere. The abnormality score may be indicated by a height from a predetermined reference position on a perpendicular axis which is defined on a predetermined shape other than a rectangle, such as a circle or a trapezoid.

The abnormality score may be indicated by a height from a predetermined reference position on a perpendicular axis to a horizon plane. In this case, even though the display unit 301 is arranged to be inclined to the horizon plane, a figure representing each metric moves upward or downward in a perpendicular direction relative to the horizon plane depending on the abnormal score. That is, a movement of the figure representing each metric is similar to a movement of an object having a real buoyant force. Thereby, a manager can easily grasp change in the abnormality score of each metric.

This application is based upon and claims the benefit of priority from Japanese Patent Application No. 2011-182261, filed on Aug. 24, 2011, the disclosure of which is incorporated herein in its entirety by reference.

REFERENCE SIGNS LIST 100 operation management apparatus
101 metric collection unit
102 correlation model generation unit
103 correlation change analysis unit
104 abnormality score calculation unit
111 metric storage unit
112 correlation model storage unit
113 correlation change storage unit
121 sequential performance information
122 correlation model
123 correlation change information
130 analysis result
131 abnormality correlation ratio display unit
132 abnormality correlation display unit
133 abnormality score display unit
140 analysis result
141 abnormality correlation ratio display unit
142 abnormality correlation display unit
143 abnormality score display unit
200 monitored apparatus 201 monitoring agent
300 monitoring terminal

What is claimed is:

1. An apparatus for tracking an operation status of a system, comprising:
a memory that stores a set of instructions; and
a hardware processor configured to execute the set of instructions to:
collect a measured value of each of a plurality of metrics in the system at different time points;
determine, based on a model and the measured values, a correlation among the plurality of metrics at the different time points;
determine a continuity level based on one or more variations in the correlation at the different time points;
determine, based on the abnormality score, a size and a position for a figure that tracks the abnormality score on a display device; and
control the display device to update a display of the figure based on the determined size and at the determined position.

2. The apparatus according to claim 1, wherein the hardware processor is further configured to execute the set of instructions to:
determine the size of the figure with an approximately circular shape, the size being larger depending on the abnormality score, and a height from a reference point set on a predetermined perpendicular axis, the height being higher depending on the abnormality score; and
control the display device to display the figure at the determined size and at the height from the reference point.

3. The apparatus according to claim 1, wherein the hardware processor is further configured to execute the set of instructions to:
generate a group including the metrics that have the same start time of detection of the abnormality; and
determine a total value of the abnormality scores of the metrics included in the group, as an abnormality score of the group.

4. The apparatus according to claim 1, wherein the hardware processor is further configured to execute the set of instructions to determine, on the basis of an abnormality level indicating a degree of an abnormality of the measurement value and the continuity level for each of the plurality of metrics at each time, the abnormality score for the metric.

5. The apparatus according to claim 4, further comprising a storage unit which stores the model; wherein the model includes one or more correlation functions each indicating a correlation between two different metrics in the plurality of metrics, wherein
the abnormality level is calculated on the basis of a conversion error obtained by applying the measured value of each of the plurality of metrics to the correlation function.

6. The apparatus according to claim 1, wherein the continuity level is a ratio of a length of time period during which the abnormality is detected within a predetermined length of time period.

7. An method for tracking an operation status of a system, comprising:
collecting a measured value of each of a plurality of metrics in a system at different time points;
determining, based on a model and the measured values, a correlation among the plurality of metrics at the different time points;
determining a continuity level based on one or more variations in the correlation at the different time points;
determining, based on the abnormality score, a size and a position for a figure that tracks the abnormality score on a display device; and
controlling the display device to update a display of the figure based on the determined size and at the determined position.

8. The method according to claim 7, further comprising:
determining the size of the figure with an approximately circular shape, the size being larger depending on the abnormality score, and a height from a reference point set on a predetermined perpendicular axis, the height being higher depending on the abnormality score; and
controlling the display device to display the figure with the size at the height from the reference point.

9. The method according to claim 7, further comprising:
generating a group including the metrics that have the same start time of detection of the abnormality; and
determining a total value of the abnormality scores of the metrics included in the group, as an abnormality score of the group.

10. The method according to claim 7, further comprising:
determining, on the basis of an abnormality level indicating a degree of an abnormality of the measured values and the continuity level for each of the plurality of metrics at the different time points, the abnormality score for the metric.

11. The method according to claim 10, wherein the model includes one or more correlation functions each indicating a correlation between two different metrics in the plurality of metrics,
wherein the abnormality level is calculated on the basis of a conversion error obtained by applying the measured value of each of the plurality of metrics to the correlation function.

12. The method according to claim 7, wherein
the continuity level is a ratio of a length of time period during which the abnormality is detected within a predetermined length of time period.

13. A non-transitory computer readable storage medium recording thereon a program, causing a computer to perform a method comprising:
collecting a measured value of each of a plurality of metrics in a system at different time points;
determining, based on a model and the measured values, a correlation among the plurality of metrics at the different time points;
determining a continuity level based on one or more variations in the correlation at the different time points;
determining, based on the abnormality score, a size and a position for a figure that tracks the abnormality score on a display device; and
controlling the display device to update a display of the figure based on the determined size and at the determined position.

14. The non-transitory computer readable storage medium according to claim 13, wherein the method further includes:
determining the size of the figure with an approximately circular shape, the size being larger depending on the abnormality score, and a height from a reference point set on a predetermined perpendicular axis, the height being higher depending on the abnormality score; and
controlling the display device to display the figure with the size at the height from the reference point.

15. The non-transitory computer readable storage medium according to claim 13, wherein the method further includes:

generating a group including the metrics that have the same start time of detection of the abnormality; and determining a total value of the abnormality scores of the metrics included in the group, as an abnormality score of the group.

16. The non-transitory computer readable storage medium according to claim 13, wherein the method further includes determining, based on an abnormality level indicating a degree of an abnormality of the measured values and the continuity level for each of the plurality of metrics at each time, the abnormality score for the metric.

17. The non-transitory computer readable storage medium according to claim 16, wherein the model includes one or more correlation functions each indicating a correlation between two different metrics in the plurality of metrics, wherein the abnormality level is calculated on the basis of a conversion error obtained by applying the measured value of each of the plurality of metrics to the correlation function.

18. The non-transitory computer readable storage medium according to claim 13, wherein the continuity level is a ratio of a length of time period during which the abnormality is detected within a predetermined length of time period.

\* \* \* \* \*